(12) United States Patent
Lebeda

(10) Patent No.: US 10,136,743 B1
(45) Date of Patent: Nov. 27, 2018

(54) RACK AND FRAME SYSTEMS FOR DISPLAYING EQUIPMENT/MEMORABILIA AND A PLURALITY OF PHOTOGRAPHS

(71) Applicant: Will Lebeda, Bend, OR (US)

(72) Inventor: Will Lebeda, Bend, OR (US)

( * ) Notice: Subject to any disclaimer, the term of this patent is extended or adjusted under 35 U.S.C. 154(b) by 0 days.

(21) Appl. No.: 15/727,633

(22) Filed: Oct. 8, 2017

(51) Int. Cl.
*A47G 1/06* (2006.01)
*A47G 1/16* (2006.01)

(52) U.S. Cl.
CPC ........... *A47G 1/065* (2013.01); *A47G 1/1613* (2013.01); *A47G 2001/0672* (2013.01); *A47G 2001/0677* (2013.01)

(58) Field of Classification Search
CPC .............................. A47G 1/065; A47G 1/1613
See application file for complete search history.

(56) References Cited

U.S. PATENT DOCUMENTS

| | | | |
|---|---|---|---|
| 3,009,235 A | 11/1961 | De Mestral | |
| 3,117,672 A * | 1/1964 | Morletti | A47G 1/065 211/87.01 |
| 3,157,932 A | 11/1964 | Kyrias | |
| 4,317,262 A | 3/1982 | Wells, Jr. | |
| 4,478,381 A | 10/1984 | Pittion et al. | |
| 5,201,100 A | 4/1993 | Cardinale | |
| 5,342,014 A * | 8/1994 | Wilson | A47G 1/1686 248/476 |
| 5,413,228 A | 5/1995 | Le Clerc | |
| D363,184 S | 10/1995 | Elhage | |
| 6,101,684 A | 8/2000 | Ginocchio | |
| 6,519,868 B1 * | 2/2003 | Pryor | A47G 1/065 248/221.12 |
| 6,948,878 B1 | 9/2005 | Smith, Jr. et al. | |
| D521,366 S | 5/2006 | Polak et al. | |
| 7,090,085 B1 | 8/2006 | Vicendese et al. | |
| D580,748 S | 11/2008 | Polak et al. | |
| 8,079,610 B2 | 12/2011 | Winefordner et al. | |
| 8,327,567 B2 | 12/2012 | Swick et al. | |
| 9,408,482 B2 | 8/2016 | Nesbitt | |
| 2005/0223611 A1 * | 10/2005 | Dennis | A47G 1/065 40/729 |

(Continued)

OTHER PUBLICATIONS

Ebay, web site, "Family Tree Picture Frame 10 Photos Precious Memories Display Love Together Gift," at least as early as Jul. 12, 2017, 6 pages.

(Continued)

*Primary Examiner* — Gary C Hoge
(74) *Attorney, Agent, or Firm* — Law Office of Karen Dana Oster, LLC

(57) ABSTRACT

Rack and frame systems disclosed herein are for displaying equipment/memorabilia and photographs. The system preferably includes a base, a rack subsystem, and a frame subsystem. The base preferably includes a base spine, a plurality of base ribs, and a plurality of base mounts. Each base rib preferably extends from the base spine and has an associated base mount. The rack subsystem includes at least one attachment device and the base spine. The attachment device(s) is/are for removably securing the equipment/ memorabilia to the base spine. The frame subsystem includes a plurality of frames and the plurality of base mounts. Each frame is connectable to a respective base mount.

19 Claims, 18 Drawing Sheets

(56) References Cited

U.S. PATENT DOCUMENTS

| | | | |
|---|---|---|---|
| 2006/0201039 A1* | 9/2006 | Gilliland | A47G 1/065 40/605 |
| 2007/0193966 A1 | 8/2007 | Dettorre | |
| 2010/0154266 A1* | 6/2010 | Vincent | A47G 1/065 40/711 |
| 2010/0201144 A1 | 8/2010 | Radle et al. | |
| 2012/0047785 A1* | 3/2012 | Swick | A47G 1/065 40/729 |
| 2016/0216097 A1* | 7/2016 | Sershon | A47G 1/065 |

OTHER PUBLICATIONS

Great Golf Memories, a Division of Eureka Golf Products, Inc., "Golf Club Shadow Box Display," at least as early as Jul. 13, 2017, 2 pages.

Pinterest, "Dad's Golfing Frames," published Jun. 3, 2010, Suzie Shinseki, 1 page.

Pinterest, "Baseball and Photo Shadow Box Display Case," at least as early as Jul. 13, 2017, 1 page.

Rhino-Rack, "Ski & Snowboard Carriers," at least as early as Oct. 6, 2017, www.rhinorack.com/en-us/products/sport-leisure/snow/ski-snowboard-carriers, 2 pages.

* cited by examiner

*FIG. 28*                    *FIG. 29*

RACK AND FRAME SYSTEMS FOR DISPLAYING EQUIPMENT/MEMORABILIA AND A PLURALITY OF PHOTOGRAPHS

FIELD OF THE INVENTION

Disclosed herein are rack and frame systems and, more specifically, rack and frame systems for displaying equipment/memorabilia and a plurality of photographs.

BACKGROUND OF THE INVENTION

Systems for framing and displaying multiple photographs are known. Examples include U.S. Pat. No. 9,408,482 to Nesbitt (the "Nesbitt reference") and U.S. Pat. No. 8,327,567 to Swick et al. (the "Swick reference"). The Nesbitt reference is directed to a modular picture display system that has multiple magnetic display frames that can be attached to a ferrous strip. The Swick reference is directed to a scalable multiple frame topology system that is capable of a wide range of multiple frame geometric topologies.

There are also known systems for displaying sporting equipment and/or memorabilia. For example, U.S. Patent Application Publication No. 2007/0193966 to Dettorre (the "Dettorre reference") is directed to a multi-function sports equipment wall hanger that may be used to display a sports board, such as a surf or a snow board. Another example is U.S. Design Pat. No. D363,184 to Elhage (the "Elhage reference") which is directed to an ornamental display case for a baseball and bat. There are also commercially available systems such as a golf club shadow box (by Great Golf Memories) are designed to display one, two, three, or four clubs.

There are also known systems for displaying both a photograph (or, in one known case, photographs) and sporting equipment and/or memorabilia. For example, U.S. Pat. No. 5,413,228 to Le Clerc (the "Le Clerc reference") is directed to a storage rack for storing sports equipment that, in one version, is shown with a device for displaying a single (and replaceable) flat planer object such as a card photograph or the like. Another example is U.S. Pat. No. 7,090,085 to Vicendese et al. (the "Vicendese reference") which is directed to a trophy item holder that associates the trophy item (e.g. a baseball bat) with a descriptive card that provides information on the item and its user. The Vicendese reference also indicates that photographs or a certificate of authenticity may also be displayed. A PINTEREST® customer pinned from amazon.com a fancy baseball and photo display case shadow box that holds multiple baseballs and a photograph. There are also crafting items that incorporate photographs and sporting goods such as the "Dad's Golfing Frames" discussed at www.favecrafts.com.

BRIEF SUMMARY OF THE INVENTION

Disclosed herein are rack and frame systems and, more specifically, rack and frame systems for displaying equipment/memorabilia and a plurality of photographs.

Disclosed herein is a rack and frame system for displaying equipment/memorabilia and photographs. The system preferably includes a base, a rack subsystem, and a frame subsystem. The base preferably includes a base spine, a plurality of base ribs, and a plurality of base mounts. Each base rib preferably extends from the base spine and has an associated base mount. The rack subsystem includes at least one attachment device and the base spine. The attachment device(s) is/are for removably securing the equipment/ memorabilia to the base spine. The frame subsystem includes a plurality of frames and the plurality of base mounts. Each frame is connectable to a respective base mount.

Some rack subsystems, as described herein, may be designed to display the equipment/memorabilia at a hanging angle of between 30 degrees and 70 degrees. Some rack subsystems, as described herein, may be designed to be hung at a hanging angle, each base rib of the plurality of base ribs associated with the base spine at a rib angle, the hanging angle equal to the rib angle such that the base ribs are parallel to each other.

Some base spines, as described herein, may be telescoping base spines.

Some base ribs, as described herein, may be adjustable base ribs.

Some attachment devices, as described herein, may be secure attachment devices.

Some attachment devices, may be fabric attachment devices, claw attachment devices, adjustable attachment devices, hidden attachment devices, pinch attachment devices, padded attachment devices, and/or magnet attachment devices.

Some frames, as described herein, may be directly connectable to a respective base mount. Some frames, as described herein, may be indirectly connectable to a respective base mount.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

BRIEF DESCRIPTION OF THE SEVERAL VIEWS OF THE DRAWINGS

The accompanying drawings illustrate various exemplary rack and frame systems for displaying equipment/memorabilia and a plurality of photographs and/or provide teachings by which the various exemplary rack and frame systems for displaying equipment/memorabilia and a plurality of photographs are more readily understood.

FIG. 28 is a first side view of the base of FIG. 26.

FIG. 29 is a second side view of the base of FIG. 26.

Figure 1:
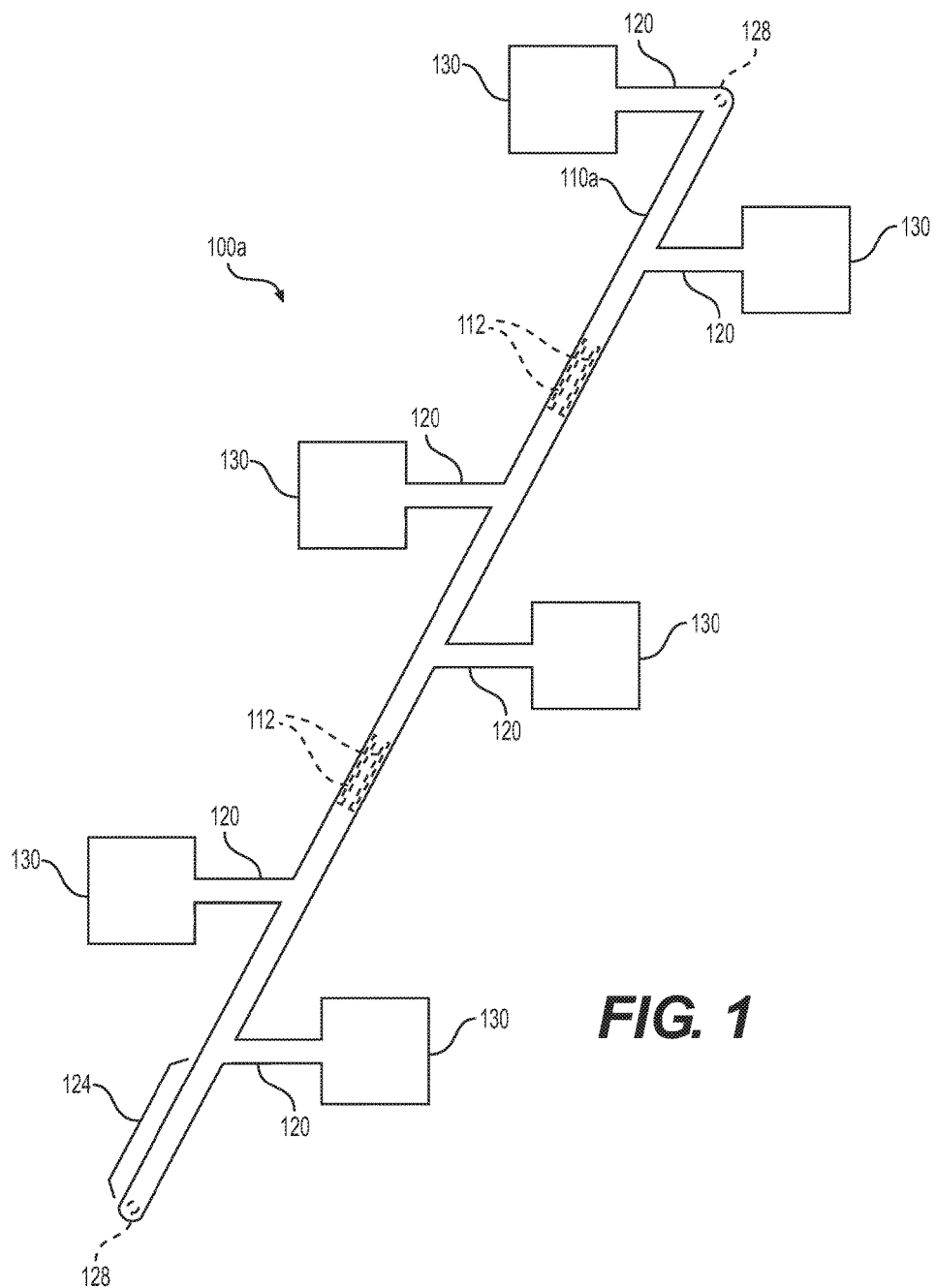
FIG. 1 is a front view of a base of an exemplary rack and frame system for displaying equipment/memorabilia and a plurality of photographs, the base including a base spine, a plurality of base ribs extending from the base spine, and the base mount, one end of the base spine extending beyond the exterior base rib.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Disclosed herein are rack and frame systems and, more specifically, rack and frame systems for displaying equipment/memorabilia and a plurality of photographs.

Known systems that can be used to display both a photograph and equipment/memorabilia (e.g. the Le Clerc reference, the Vicendese reference, and the references found online and discussed in the Background) miss a very important point. The most treasured equipment/memorabilia are often needed for use on a regular basis. The enthusiast will need the favorite putter, the lucky bat, or grandpa's fishing pole constantly. On the other hand, the enthusiast is proud of these beloved items and wants to display them, not put them in a corner or in the garage. The rack and frame systems described herein provide the enthusiast with the ability to attractively display equipment/memorabilia. (As a contrast, the Le Clerc and Vicendese reference only provides a way to hang a bat from a hook in a downward orientation, which might be acceptable in a "man cave" or locker room, but not in a living room.) The rack and frame systems described herein provide the enthusiast with the ability to securely display equipment/memorabilia without damaging the equipment/memorabilia. The rack and frame systems described herein, also provide the enthusiast with the ability quickly remove the equipment/memorabilia for use. Further, the rack and frame systems described herein, provide the user with the ability to display photographs in an attractive arrangement about the equipment/memorabilia. These photographs can also be removed and replaced in a convenient fashion so that the enthusiast can display his latest hole in one, homerun, or catch of a lifetime! As shown in FIGS. 1-6, the rack and frame system includes a base (referenced generally as 100, but shown as 100a-100f) that includes the base spine (referenced generally as 110, but shown as 110a-110o), a plurality of base ribs 120 extending from the base spine 110, and a plurality of base mounts 130 (which may be part of or used with a two-part base/frame connector). The rack and frame system includes both a rack (for displaying equipment/memorabilia) and a plurality of frames (for displaying photographs). The rack preferably consists of a central elongate unit (the base spine 110 of the base 100) and at least one attachment device (e.g. the attachment devices 300, 310, 320, 330, 340, 350, 360 shown in FIGS. 9-15). The plurality of base ribs 120 (spacing units) provide a distance between the base spine 100 and the plurality of base mounts 130 and/or their respective frames 160.

Exemplary systems may be better understood with reference to the drawings, but the shown systems are not intended to be of a limiting nature. The same reference numbers will be used throughout the drawings and description in this document to refer to the same or like parts. Some reference numbers (e.g. reference numbers 100a-100f) refer to specific variations, whereas all the variations are referred to jointly by the general reference number 100. The shown shapes and relative dimensions are preferred, but are not meant to be limiting unless specifically claimed, in which case they may limit the scope of that particular claim.

Definitions

Before describing the rack and frame systems and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The phrase "rack and frame system" is meant to include both a rack and a plurality of frames. The rack is for displaying equipment/memorabilia. The plurality of frames is for displaying photographs.

The phrase "equipment/memorabilia" is meant to include traditional and nontraditional sporting equipment/memorabilia such as golf clubs (FIG. 21), ski poles (FIG. 22), fishing rods (FIG. 23), badminton or tennis rackets (FIG. 24), skis (FIG. 25), baseball bats (not shown), hockey sticks (not shown), cricket paddles (not shown), pole vault poles (not shown), javelins (not shown), pool sticks (not shown), snow boards (not shown), skate boards (not shown), lacrosse sticks or shafts (not shown), paddles or oars (not shown), sword (not shown), riding crops (not shown), and any other sporting items known or yet to be discovered. Although the phrase is primarily directed to sporting equipment/memorabilia, the phrase may also include non-sporting equipment/memorabilia such as working equipment (e.g. shovels, picks, brooms) (not shown), musical instruments (e.g. fanfare trumpet, flute, sitar, violin bow, didgeridoo, alphorns) (not shown), religious items (e.g. candlesticks, shofars) (not shown), and any other non-sporting items known or yet to be discovered.

The word "photographs" is meant to include any planar objects that are meant to be displayed including, for example, photographs, plaques, certificates, or any other planar object that is meant to be displayed. In general, although not necessarily, the planar objects would be related to the associated equipment/memorabilia with which they are being displayed. It should be noted that the photographs are shown in frames 160, 164, but in some versions, the photographs and/or the photographs' edges could function as their own frames.

The phrase "magnetic material" is meant to include any material that is attracted to a magnet including, but not limited to, iron, cobalt, nickel, and steel.

The term "hinge" and other mechanical structure may include traditional structure or other structure suitable for performing the same function. For example, a "hinge" may be a traditional hinge or it may be a flexible/bendable section that allows opening and closing.

The word "wall" is meant to include any surface upon which the rack and frame system may be hung. Preferred "walls" would be generally flat and generally vertical.

The term "associated" is defined to mean integral or original, retrofitted, attached, connected (including functionally connected), positioned near, and/or accessible by.

It should be noted that relative terms are meant to help in the understanding of the technology and are not meant to limit the scope of the invention. Similarly, unless specifically stated otherwise, the terms "first," "second," and "third" are meant solely for purposes of designation and not for order or limitation.

It should be noted that some terms used in this specification are meant to be relative. For example, the term "top" is meant to be relative to the term "bottom," the term "front" is meant to be relative to the term "back," and the term "horizontal" is meant to be relative to the term "vertical." If the system was rotated, the terms would change accordingly. Rotation of the system would change the designation, but not the concept.

The terms "may," "might," "can," and "could" are used to indicate alternatives and optional features and only should be construed as a limitation if specifically included in the claims. It should be noted that the various components, features, steps, versions, or embodiments thereof are all "preferred" whether or not it is specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type.

It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

Base 100

As shown in FIGS. 1-6, a base (referenced generally as 100, but shown as 100a-100f) includes a base spine (referenced generally as 110, but shown as 110a-110o), a plurality of base ribs 120 extending from the base spine 110, and a plurality of base mounts 130 (which may be part of or used with a two-part base/frame connector). Each base rib 120 has a first rib end that is associated with the base spine 110 and a second rib end that is associated with a base mount 130. Although the majority of the shown bases have six base ribs 120, alternative bases could have fewer base ribs (e.g. four) or more base ribs (e.g. eight). A shorter base spine 110, for example, could have fewer base ribs and/or a longer base spine 110, for example, could have more base ribs. The base ribs 120 may be spaced in groupings of two (as shown), spaced evenly, or otherwise spaced along the base spine.

As shown, the base 100 is preferably hung with the base spine 110 orientated at an angle (a "hanging angle"). The hanging angle is the acute angle measured between the horizontal (e.g. the floor or the ceiling) and the base spine 110. Preferred hanging angles are between 30 degrees and 70 degrees. The shown hanging angle is approximately 60 degrees. The shown hanging angle, however, is only an example and alternative bases could be designed to hang at other hanging angles. The base ribs 120 are spaced along the base spine 110. (They may be evenly spaced or in groupings.) Preferably, the base ribs 120 are parallel to each other. The base ribs 120 are shown as being at an angle (a "rib angle") of approximately 60 degrees to the base spine 110. The rib angle is the acute angle measured between the base ribs 120 and the base spine 110. For preferred bases 100, the rib angle is dependent on the intended hanging angle. More specifically, the rib angle is preferably an angle that would position the base ribs 120 in a horizontal orientation and parallel to each other when the base spine 110 is hung at the hanging angle. To accomplish he horizontal orientation, the hanging angle would be equal to the rib angle. (In the shown example, if the hanging angle is 60 degrees, the rib angle is 60 degrees. In an alternative example, if the hanging angle is 45 degrees, the rib angle is 45 degrees.) Alternative versions of the base would be designed so that the base ribs have an alternative orientation (e.g. vertical or on a slant) and, in such a case, the hanging angle and/or rib angle would be adjusted accordingly. In addition, as discussed in connection with FIG. 8, the base ribs could be adjustable base ribs 150.

Figure 2:
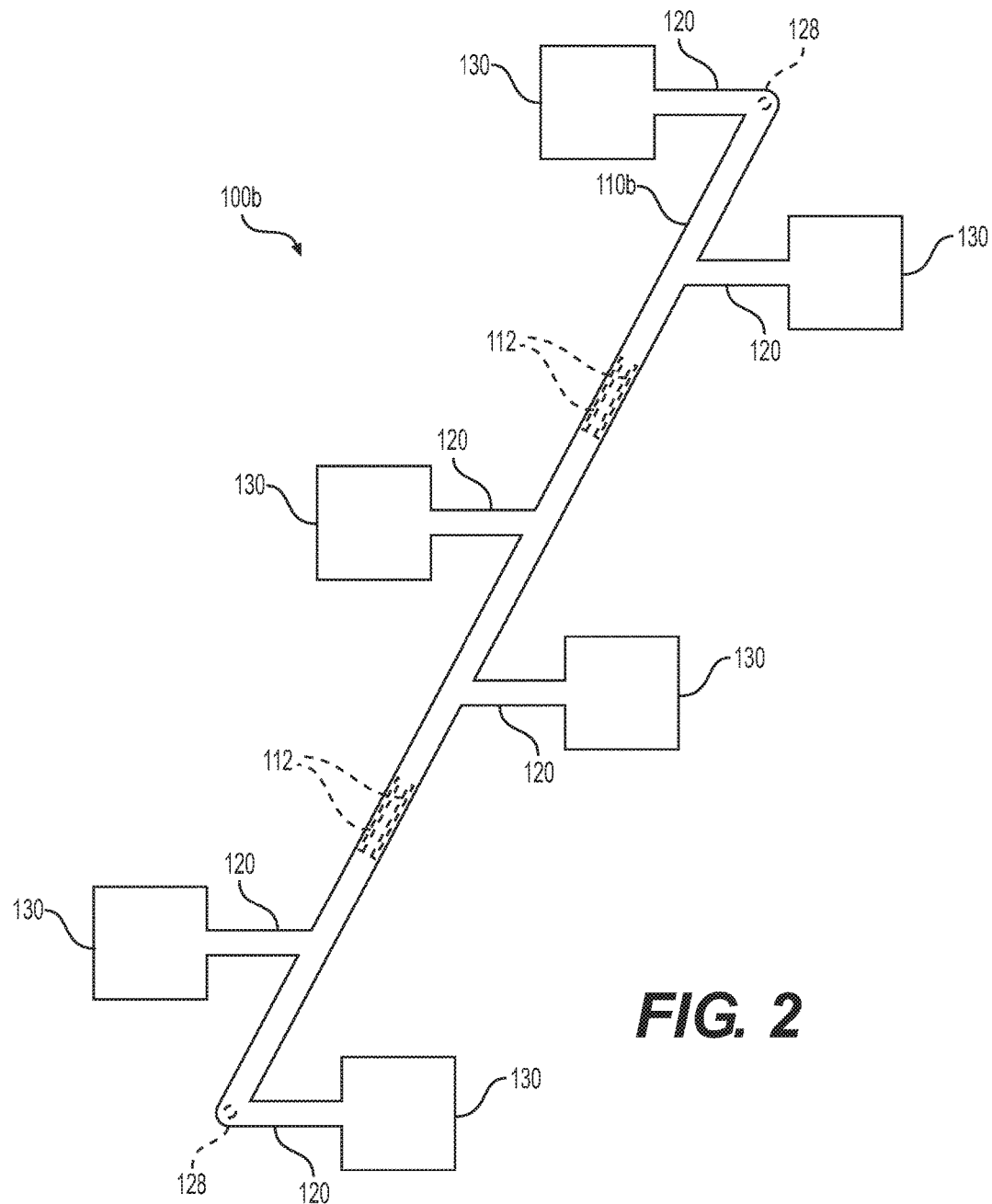
FIG. 2 is a front view of a base of an exemplary rack and frame system for displaying equipment/memorabilia and a plurality of photographs, the base including a base spine, a plurality of base ribs extending from the base spine, and the base mount, the ends of the base spine ending at the exterior base rib.
Figure 3:
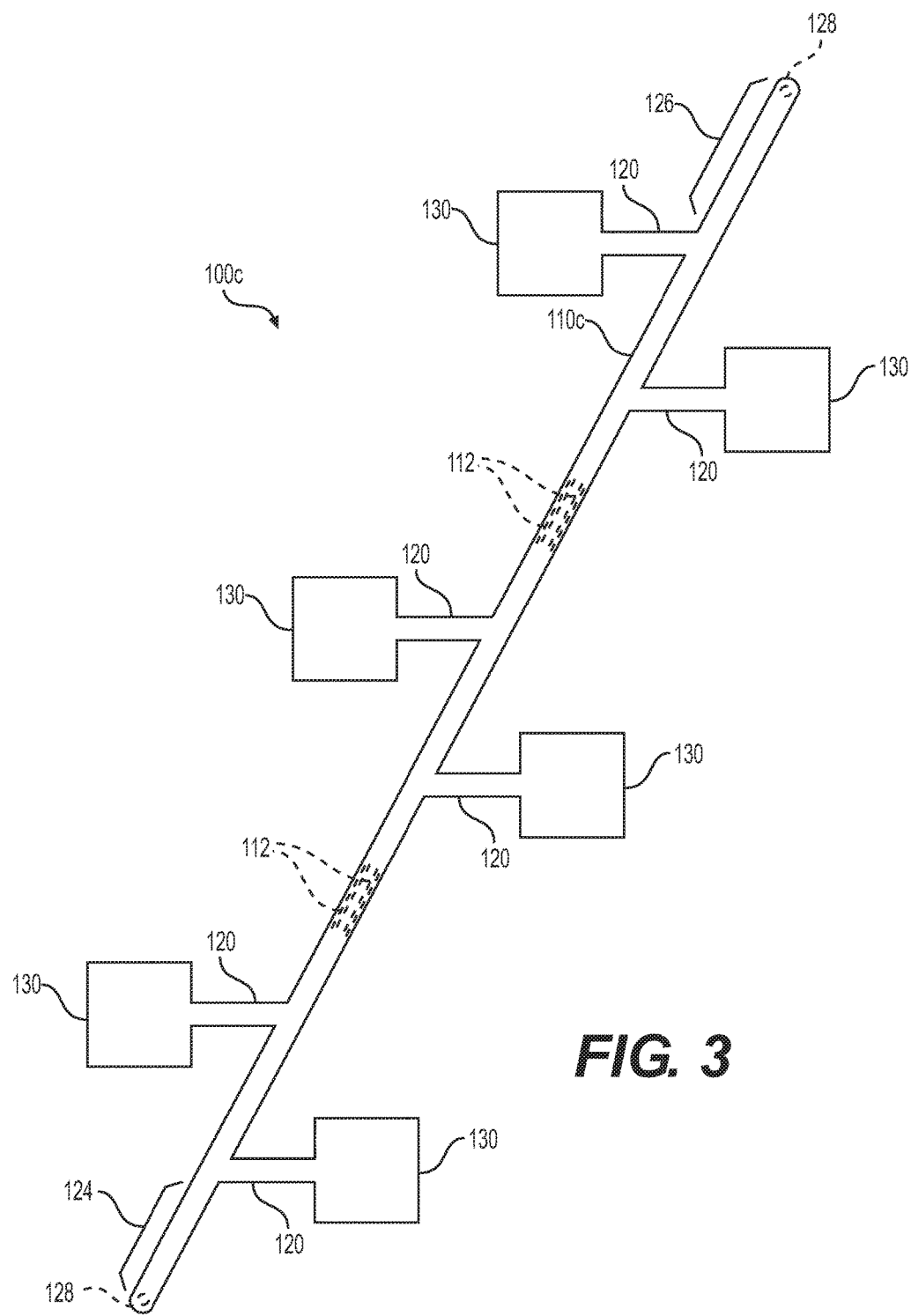
FIG. 3 is a front view of a base of an exemplary rack and frame system for displaying equipment/memorabilia and a plurality of photographs, the base including a base spine, a plurality of base ribs extending from the base spine, and the base mount, the ends of the base spine extending beyond the exterior base ribs.

FIG. 1 shows a front view of exemplary base 100a, FIG. 2 shows a front view of exemplary base 100b, and FIG. 3 shows a front view of exemplary base 100c. The primary distinction between the bases 100a-c shown in FIGS. 1-3 is whether there is one extension of the base spine (e.g. base spine 110a shown with bottom extension 124, although the extension could alternatively be a top extension), no extension of the base spine (e.g. base spine 110b), or two extensions of the base spine (e.g. base spine 110c with extensions 124, 126). Each of the bases 100 shown in FIGS. 1-3 include at least one hanging mechanism 128 (shown as a hole at the top and the bottom of the base spine 110) to secure the base 100 to a wall. A hanger (not shown, but may be a hanging device such as a nail, screw, or hook) may be inserted through each hanging mechanism 128 to hang the bases 100 on a wall.

Figure 4:
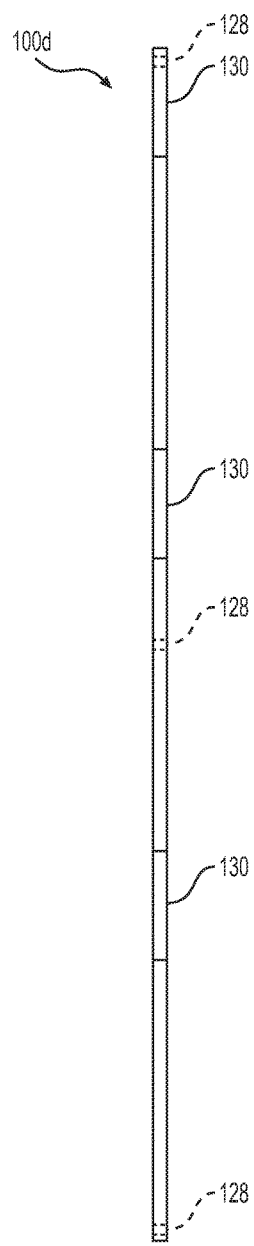
FIG. 4 is a side view of an exemplary rack and frame system in which the entire base is planar.
Figure 5:
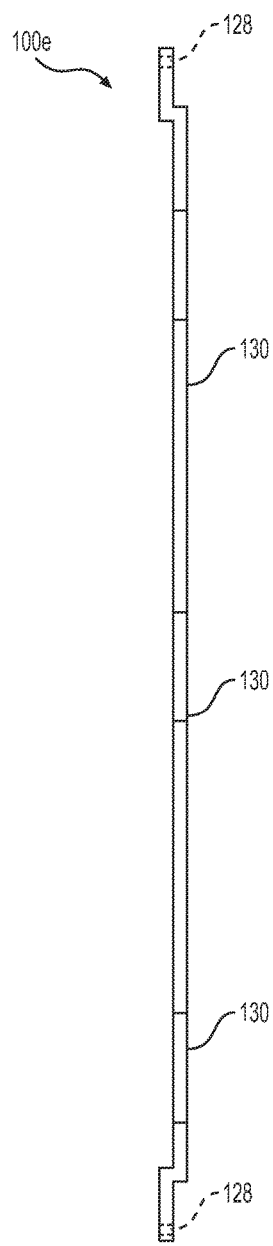
FIG. 5 is a side view of an exemplary rack and frame system in which the majority of the base is planar, but the ends are offset such that the central portion of the base is spaced from the wall when the system is hung.
Figure 6:
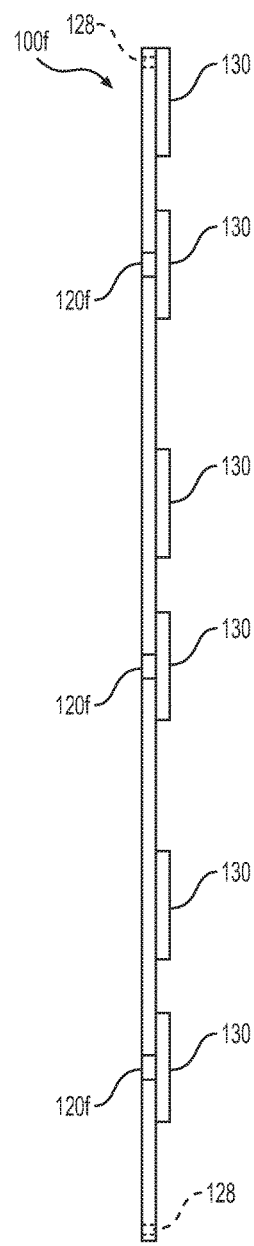
FIG. 6 is a side view of an exemplary rack and frame system in which the base spine of the base is on a first plane, and at least part of each base rib (and the respective base mount) is on a second plane, such that when the system is hung, the base spine is flush against the wall and the at least part of each base rib (and the respective base mount) are offset or spaced from the wall.

FIG. 4 shows a side view of exemplary base 100d, FIG. 5 shows a side view of exemplary base 100e, and FIG. 6 shows a side view of exemplary base 100f. The primary distinction between the bases 100d-f shown in FIGS. 4-6 is the use of levels. Put another way, these three figures show different level configurations. For example, base 100d (FIG. 4) is planar. This means that the base spine 110d and the base mount 130 are all on the same level. Although the majority of base 100e (FIG. 5) is planar, the ends are offset such that the central portion of the base 100e (base spine 100e) is spaced from the wall when the system is hung. Base 100f (FIG. 5) also has two levels: the base spine 110f of the base is on a first plane, and at least part of each base rib 120 (and the respective base mount 130) is on a second plane. As shown, the first plane is preferably lower than the second plane. The configuration of base 100f, therefore, is such that when the system is hung, the base spine 110f is flush against the wall and the at least part of each base rib 120f (and the respective base mount 130) are offset or spaced from the wall. Each of the bases 100 shown in FIGS. 4-6 include at least one hanging mechanism 128 to secure the base 100 to a wall.

It should be noted that any of the bases 100a-c of FIGS. 1-3 could be implemented with any of the level configurations of the bases 100d-f shown in FIGS. 4-6. Put another way, base 100a of FIG. 1 could be planar (like the base 100d shown in FIG. 4), have offset ends (like the base 100e shown in FIG. 5), and/or have a base spine that is lower than the base mounts (like the base 100f shown in FIG. 6). Further, base 100b of FIG. 2 could be planar (like the base 100d shown in FIG. 4), have offset ends (like the base 100e shown in FIG. 5), and/or have a base spine that is lower than the base mounts (like the base 100f shown in FIG. 6). Finally, base 100c of FIG. 3 could be planar (like the base 100d shown in FIG. 4), have offset ends (like the base 100e shown in FIG. 5), and/or have a base spine that is lower than the base mounts (like the base 100f shown in FIG. 6).

Figure 7:
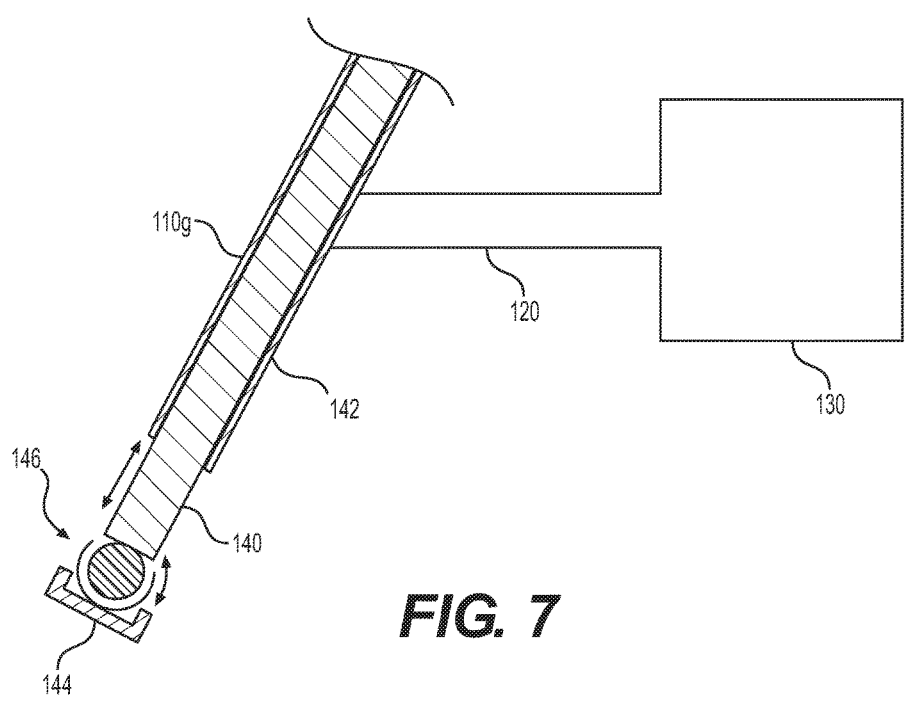
FIG. 7 is a cross-sectional view of a telescoping end of the base spine, the end of the base spine having a ball joint that facilitates the positioning of a supporting foot.

It should be noted that although FIGS. 1-6 are shown as being a fixed length, the base spines could be adjustable (e.g. expandable and/or contractible) in length. FIG. 7, for example, shows a telescoping base spine 110g that has an inner member 140 that can be pulled out of and pushed into the outer member 142. Although shown at the end, the telescoping could occur at any location along the length of the base spine. Although not shown, there could also be modular components or sections that increase the length of the base spine. For example, all or part of the base spine could be modular with modules including a set of offset base ribs 120 and their associated base mounts 130. A series of these modules could be used to construct the base. Specialized end modules that may have hanging mechanisms or may be simply ornamental.

The ends of the base spine may be rounded, flat, or have ornamental flourishes. As shown in FIG. 7, there may also be a support or "foot" 144 at the end of the base spine 110 to help support the equipment/memorabilia. The supporting foot 144 may be adjustable for proper orientation. The adjustability may be accomplished by, for example, an adjustable positioner such as a ball joint 146 (as shown). Put another way, the ball joint 146 facilitates the positioning of a supporting foot 144. Alternative adjustable positioners may be used in place of the shown ball joint 146.

Figure 8:
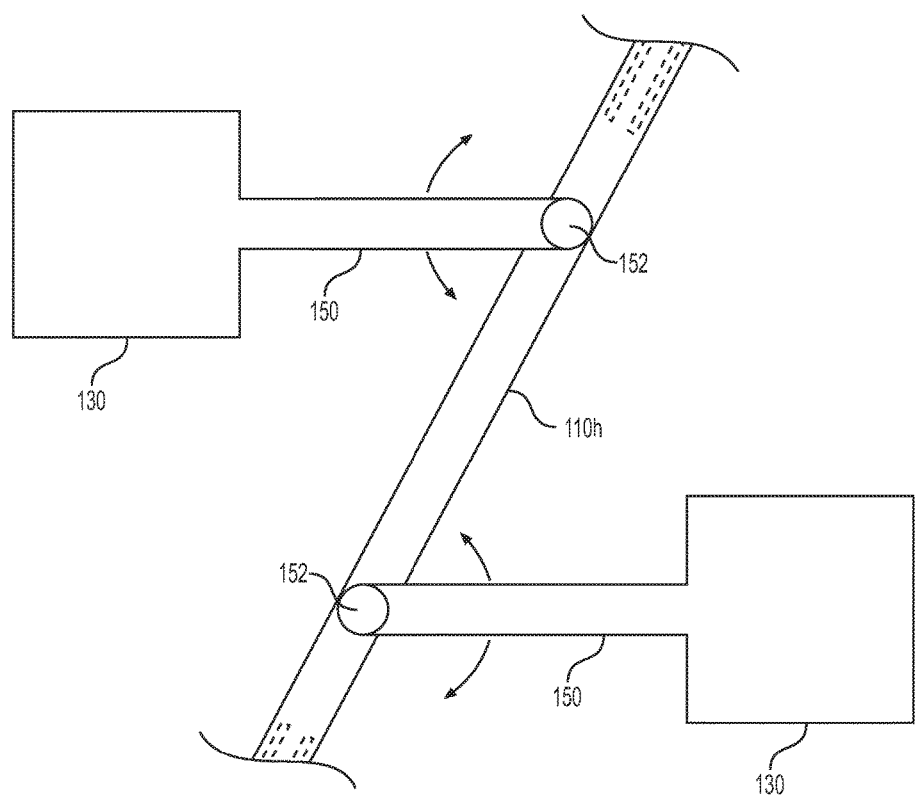
FIG. 8 is an enlarged front detailed view of a central portion of an exemplary base spine with adjustable "base ribs."

It should be noted that although most of the base ribs 120 are shown as being stationary, FIG. 8 shows an alternative base in which the base ribs are adjustable base ribs 150. The adjustability may be accomplished by, for example, an adjustable positioner such as a pivot 152 (as shown). Alternative adjustable positioners may be used in place of the shown pivot 152. For example, the adjustable base ribs 150 could be slidable along the length of the base spine so that each user may have a custom arrangement of the photographs. The base ribs may also be telescoping such that their length can be increased or decreased.

The bases 100 shown in FIGS. 1-6 have base spines 110 that have a substantially constant width (the side edges being substantially parallel). These bases also are shown with the base spines 110 having approximately the same width (or a slightly larger width) as the base ribs 120. It should be noted that the particular widths could be adapted for their intended use. For example, the base spine for a base to be used with a fishing pole (FIG. 23) might be very narrow or tapered at one end. On the other hand, the base spine for a base to be used with a ski (FIG. 25) might be very wide to add additional support. Similarly, the length of the base spines, the width of the ribs, and/or length of the ribs could also be adjusted for intended use.

Rack Subsystem

For purposes of explaining the rack and frame system, it should be understood that there are two functions that the system accomplishes simultaneously. In this section, the rack function will be discussed.

The rack subsystem is designed to display equipment/memorabilia. As the equipment/memorabilia may be a prized position, the rack is designed to securely display equipment/memorabilia without damaging the equipment/memorabilia. As the equipment/memorabilia may be a functional item that is desired for use, the rack is designed to removably display equipment/memorabilia. The ability to both secure the equipment/memorabilia and to allow the equipment/memorabilia to be easily removed for use is referred to as "removably securing."

The rack subsystem preferably consists of a central elongate unit (the base spine 110 of the base 100) and at least one attachment device (e.g. the attachment devices 300, 310, 320, 330, 340, 350, 360 shown in FIGS. 9-15). All of the exemplary attachment devices are secure attachment devices, not just a bare hook. This allows the equipment/memorabilia to be displayed at an angle (as opposed to just vertically or horizontally). As will be discussed the "hanging angle" is preferably between 30 degrees and 70 degrees. The exemplary attachment devices are discussed individually below. It should be noted that any of the attachment devices 300, 310, 320, 330, 340, 350, 360 can be used with any of the base spines 110 of the bases 100. Unless specifically claimed, these and other attachment devices can be used so long as they can securely and, preferably, removably attach equipment/memorabilia to the base spine 110 (e.g. "removably secure"). That being said, each attachment device has its own unique advantages as indicated.

Figure 9:
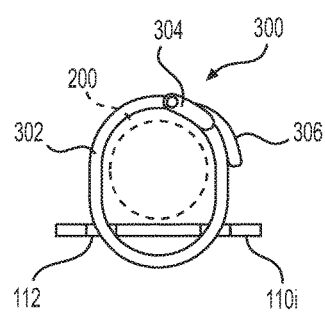
FIG. 9 is a side view of a first exemplary attachment device for use with a rack and frame system, the first exemplary attachment device including a hook and loop fabric that folds back on itself.

FIG. 9 shows a first exemplary attachment device 300 (a "fabric" attachment device) that may be used to attach equipment/memorabilia (shown as a golf club 200) to a base spine 110i. The first exemplary attachment device 300 is a strip of hook and loop fabric 302. In the shown attachment device 300, the strip of hook and loop fabric 302 has a loop 304 at one end. The other end is inserted through the loop 304 and folds 306 back on itself. One advantage of the first exemplary attachment device 300 is that, in the shown version, it can be removed and replaced (using slots 112 in the base spine 110i). In some versions the first exemplary attachment device 300 can also be trimmed to size. The replacability and modifiability allows a user to customize the size of the first exemplary attachment device 300 to equipment/memorabilia of different sizes and shapes.

Figure 10:
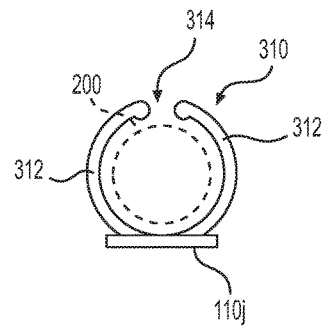
FIG. 10 is a side view of a second exemplary attachment device for use with a rack and frame system, the second exemplary attachment device including a bendable, flexible claw or pinching grip.

FIG. 10 shows a second exemplary attachment device 310 (a "claw" attachment device) that may be used to attach equipment/memorabilia (shown as a golf club 200) to a base spine 110j. The second exemplary attachment device 310 is a bendable, flexible claw or pinching grip that is shown as integral with or permanently attached to the base spine 110j. In the shown attachment device 310, two curved "fingers" or "jaws" 312 extend generally upward from the base spine 110j with their concave faces facing each other. The unattached ends of the curved "fingers" or "jaws" 312 are preferably separated by a gap 314 defined between the curved "fingers" or "jaws" 312. One advantage of the second exemplary attachment device 310 is that, in the shown version, it can be used single-handed. Inserting the equipment/memorabilia is accomplished by pushing the equipment/memorabilia through the gap 314. Removing the equipment/memorabilia is accomplished by pulling the equipment/memorabilia through the gap 314.

Figure 11:
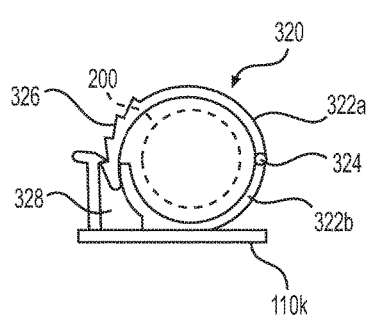
FIG. 11 is a side view of a third exemplary attachment device for use with a rack and frame system, the third exemplary attachment device including a releasable clamp.

FIG. 11 shows a third exemplary attachment device 320 (an "adjustable" attachment device) that may be used to attach equipment/memorabilia (shown as a golf club 200) to a base spine 110k. The third exemplary attachment device 320 includes an adjustable and releasable clamp that is shown as integral with or permanently attached to the base spine 110k. This attachment device may function as a simple ratchet system. The third exemplary attachment device 320 has a top section 322a and a bottom section 322b that may be attached by an optional hinge 324 on one side. (Alternatively, the top section 322a and bottom section 322b may be integral, but flexible enough to allow the third exemplary attachment device 320 to be opened and closed.) The bottom section 322b is associated with the base spine 110k. At least the top section 322a is preferably very bendable. The top section 322a has structure (shown as barbs) at its "free" end 326 that allows it to releasably mate with the "free" end 328 of the bottom section 322b. There may be additional structure associated with the bottom section 322b that allows for securing (locking) the "free" end 326 of the top section 322a into a relationship with the "free" end 328 of the bottom section 322b. The shown "barbs" allow the user to adjust the size of the third exemplary attachment device 320 so that it can accommodate equipment/memorabilia of different sizes. The ability to accommodate equipment/memorabilia of different sizes is one of the advantages of the third exemplary attachment device 320.

Figure 12:
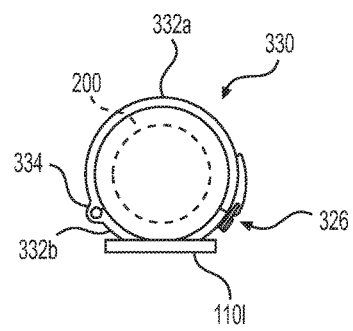
FIG. 12 is a side view of a fourth exemplary attachment device for use with a rack and frame system, the fourth exemplary attachment device including a releasable clamp with a fold over, quick release handle.

FIG. 12 shows a fourth exemplary attachment device 330 (a "hidden" attachment device) that may be used to attach equipment/memorabilia (shown as a golf club 200) to a base spine 110l. The fourth exemplary attachment device 330 includes a releasable clamp (with a fold over, quick release latch that is positioned to be hidden from view) that is shown as integral with or permanently attached to the base spine 110l. The fourth exemplary attachment device 330 has a top section 332a and a bottom section 332b that may be attached by an optional hinge 334 on one side. (Alternatively, the top section 332a and bottom section 332b may be integral, but flexible enough to allow the fourth exemplary attachment device 330 to be opened and closed.) The bottom section 332b is associated with the base spine 110l. Closing and securing structure 336 may be integrated into the "free" ends of the top section 332a and bottom section 332b. The closing and securing structure 336 (shown as a fold over, quick release latch) is designed to allow the user to easily open the fourth exemplary attachment device 330 for insertion of the equipment/memorabilia, but also to be able to close and secure the fourth exemplary attachment device 330 so that the equipment/memorabilia is held securely therein. One advantage of the fourth exemplary attachment device 330 is that it can be constructed in different sizes to accommodate very specific equipment/memorabilia (e.g. the fishing pole 220 of FIG. 23 that has different sized attachment devices 330 for the different locations on the fishing pole 220. Also, both the hinge 334 and the closing and securing structure 336 can be positioned such that they would be hidden behind the equipment/memorabilia for a "cleaner" display.

Figure 13:
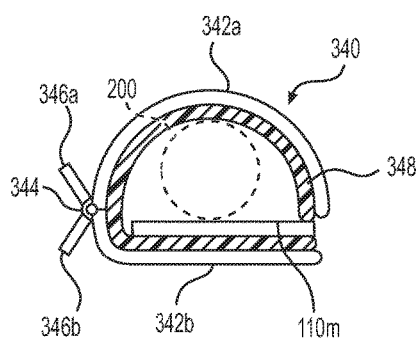
FIG. 13 is a side view of a fifth exemplary attachment device for use with a rack and frame system, the fifth exemplary attachment device including a removable, replaceable, and repositionable hinged, side pinch attachment device that may include a deformable material on the interior surfaces thereof.

FIG. 13 shows a fifth exemplary attachment device 340 (a "pinch" attachment device) that may be used to attach equipment/memorabilia (shown as a golf club 200) to a base spine 110m. The fifth exemplary attachment device 340 includes a removable, replaceable, and repositionable hinged, side-pinch attachment device that may include a minimal amount of padding (an amount of deformable material sufficient to prevent scratching of the surface of the equipment/memorabilia) on the interior surfaces thereof. Unlike many of the other attachment devices, the fifth exemplary attachment device 340 is shown as not being integral with the base spine 110m. The fifth exemplary attachment device 340 has a top section 342a and a bottom section 342b that are be attached by a pinch-hinge 344 on one side. The pinch-hinge 344 has two levers 346a, 346b. The top lever 346a is functionally associated with the top section 342a and the bottom lever 346b is functionally associated with the bottom section 342b. When the levers 346a, 346b are pinched together, the levers/sections rotate about the pinch-hinge 344 to increase the distance between the top section 342a and the bottom section 342b, thereby opening the fifth exemplary attachment device 340. In an open position, the user can insert both the equipment/memorabilia and the base spine 110m between the sections 342a, 342b. Releasing the levers 346a, 346b, the fifth exemplary attachment device 340 closes (reduces the distance between the sections 342a, 342b) and secures the equipment/memorabilia to the base spine 110m between the sections 342a, 342b. The fifth exemplary attachment device 340 is also shown has having a minimal padding 348 (deformable material) on the interior surfaces of the top section 342a and the bottom section 342b. At least the top section 342a may be made of a bendable and shape-retainable material such that a user may manually bend the top section 342a into a desired shape (e.g. one basically commensurate with the shape of the intended equipment/memorabilia) and then the top section 342a retains its shape. The bending may be (although not necessarily) accomplished using tools and/or heat. Unlike many of the other attachment devices, the fifth exemplary attachment device 340 is not shown as integral with or permanently attached to the base spine 110m. The removability, replaceability, and repositionability of the fifth exemplary attachment device 340 can be a significant advantage. For example, the tennis racket 230 shown in FIG. 24 can be attached at any location along the base spine 110m, which is a significant advantage given the variation in size and shapes of tennis rackets. The bendability and shape-retainability of at least part of the sections 342a, 342b also can help accommodate equipment/memorabilia of different shapes and sizes. The padding feature is also advantageous to prevent damage to the equipment/memorabilia.

Figure 14:
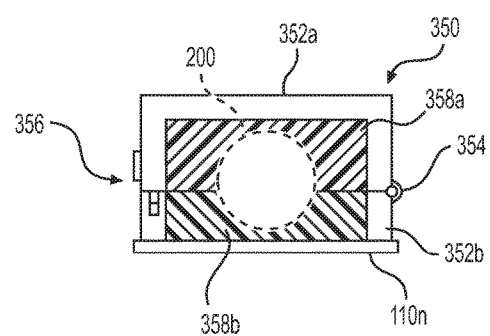
FIG. 14 is a side view of a sixth exemplary attachment device for use with a rack and frame system, the sixth exemplary attachment device including a hinged releasably-locking attachment device that may include a deformable material on the interior surfaces thereof.
Figure 25:
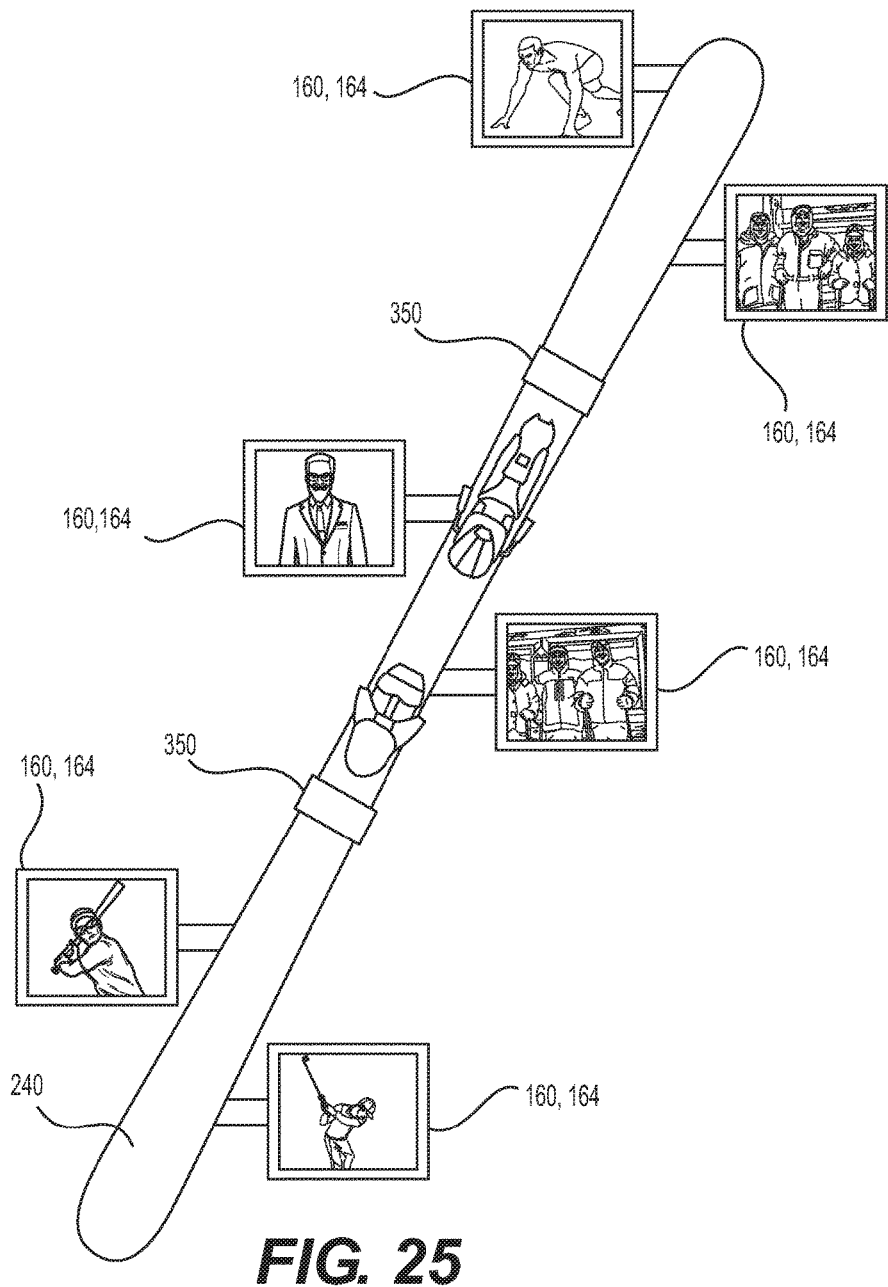
FIG. 25 is a front view of a ski attached to a base spine and photographs displayed in a frame on an exemplary rack and frame system, the ski shown as being secured to the base using sixth exemplary attachment devices (such as those shown in FIG. 14).
Figure 26:
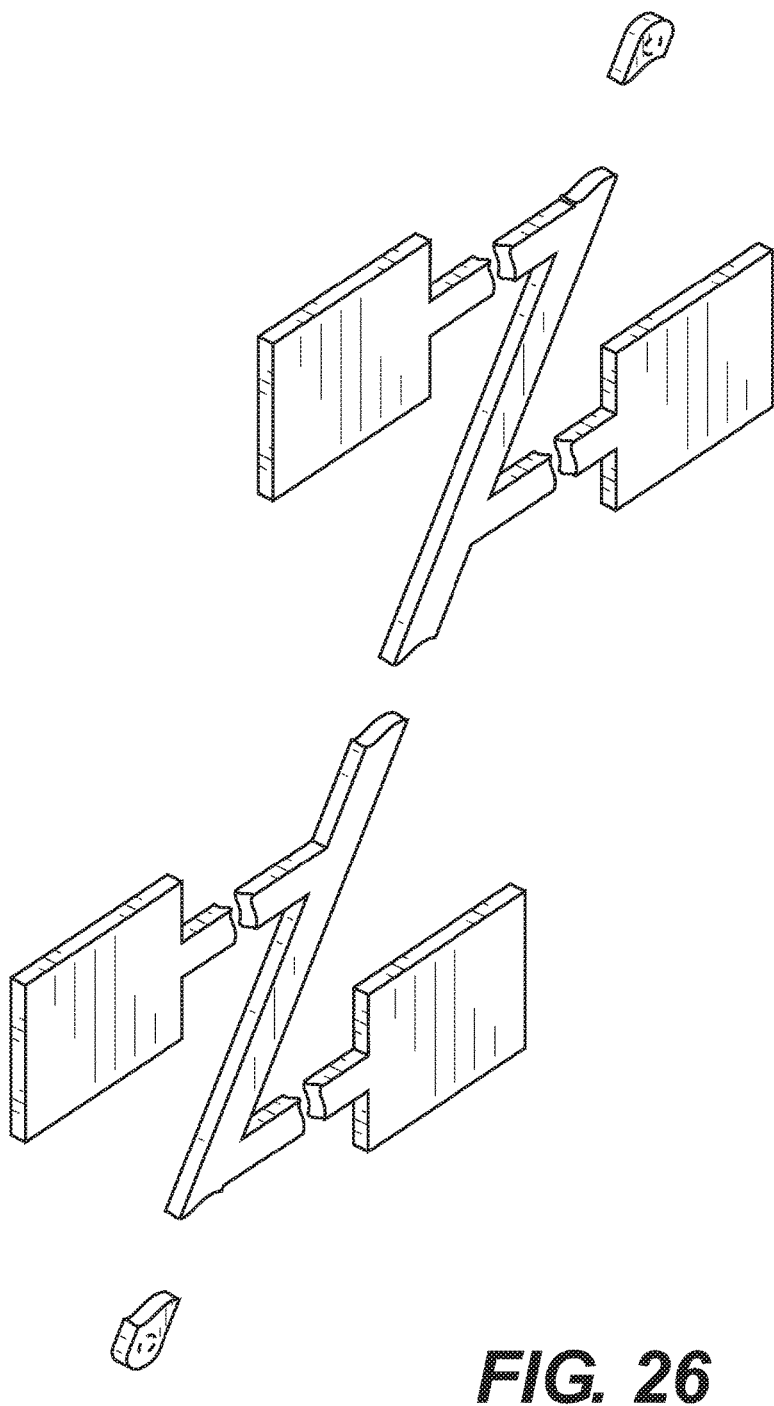
FIG. 26 is a perspective view of a base of an exemplary rack and frame system.
Figure 27:
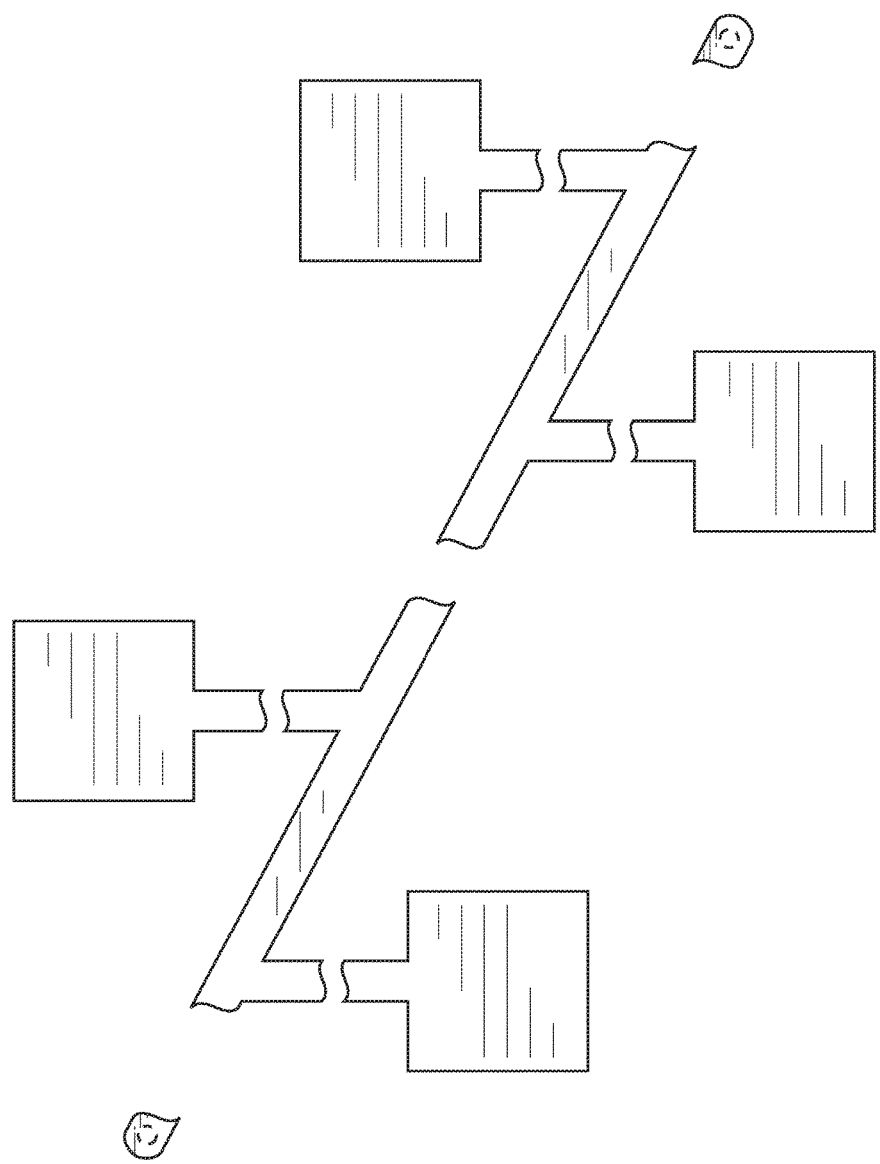
FIG. 27 is a front view of the base of FIG. 26.
Figure 30:
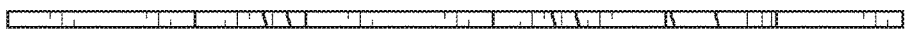
FIG. 30 is a top view of the base of FIG. 26.
Figure 31:
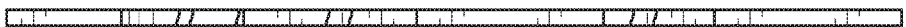
FIG. 31 is a bottom view of the base of FIG. 26.

FIG. 14 shows a sixth exemplary attachment device 350 (a "padded" attachment device) that may be used to attach equipment/memorabilia (shown as a golf club 200) to a base spine 110n. The sixth exemplary attachment device 350 is shown as integral with or permanently attached to the base spine 110n. The sixth exemplary attachment device 350 is shown as wider and/or flatter (and could even be implemented even wider and/or flatter than shown) than some of the other attachment devices. This wider/flatter profile would be particularly suitable for use with equipment/memorabilia that is wider/flatter (e.g. skis (as shown in FIG. 25), snow boards, hockey sticks). The sixth exemplary attachment device 350 includes a hinged a releasably-locking attachment device that may include significant amount of padding (an amount of deformable material sufficient to hold and help secure the equipment/memorabilia) on the interior surfaces thereof. The sixth exemplary attachment device 350 has a top section 352a and a bottom section 352b that are preferably attached by a hinge 354 on one side. The bottom section 352b is associated with the base spine 110l. Closing and securing structure 356 may be integrated into the "free" ends of the top section 352a and bottom section 352b. The closing and securing structure 356 (shown as a button and latch system) is designed to allow the user to easily open the sixth exemplary attachment device 350 for insertion of the equipment/memorabilia, but also to be able to close and secure the sixth exemplary attachment device 350 so that the equipment/memorabilia is held securely therein. The sixth exemplary attachment device 350 is also shown has having a significant padding 358a, 358b (deformable material) on the interior surfaces of the top section 352a and the bottom section 352b. The padding 358a, 358b holds and helps secure the equipment/memorabilia between the sections 352a, 352b so that the equipment/memorabilia does not move once it has been secured therebetween. The padding may be a material that temporarily deforms and then returns to its original shape. This would allow the sixth exemplary attachment device 350 to be used with different equipment/memorabilia. Alternatively, the padding may be a material that permanently deforms to provide a custom fit for a specific equipment/memorabilia. The padding feature is advantageous to prevent damage to the equipment/memorabilia. Also, the significant padding can provide adaptability and security the sixth exemplary attachment device 350.

Figure 15:
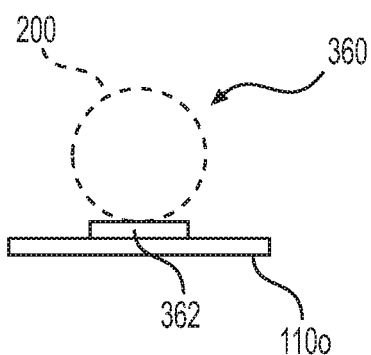
FIG. 15 is a side view of a seventh exemplary attachment device for use with a rack and frame system, the seventh exemplary attachment device including a magnet that may attach to equipment/memorabilia that is at least partially made from magnetic material.

FIG. 15 shows a seventh exemplary attachment device 360 (a "magnet" attachment device) that may be used to attach equipment/memorabilia (shown as a golf club 200) to a base spine 1100. The seventh exemplary attachment device 360 includes a magnet 362 that may attach to equipment/memorabilia that is at least partially made from magnetic material. This seventh exemplary attachment device 360 may be one or more magnets 362 that are positioned along the length of the base spine 1100. Although not shown, magnetic material may be associated with non-metallic equipment/memorabilia so that it functions with the seventh exemplary attachment device 360. Put another way, a small magnetic material band may be placed around a shaft of non-metallic equipment/memorabilia so that the band can attach to the magnet 362. A different type of magnetic material device and/or attachment mechanism can be used in place of the small magnetic material band. For example, the magnetic material device can be a small disk that is attached to the equipment/memorabilia using adhesive. One advantage of the seventh exemplary attachment device 360 is that it can be hidden completely behind the equipment/memorabilia. Another advantage is that the equipment/memorabilia can be attached to and removed from the base spine 110o with the user only using a single hand. Yet another advantage is that the seventh exemplary attachment device 360 could attach to equipment/memorabilia of almost any size and shape.

Other exemplary attachment devices are disclosed in U.S. Pat. No. 3,009,235 to Mestral, U.S. Pat. No. 3,157,932 to Kyrias, U.S. Pat. No. 4,317,262 to Wells, Jr., U.S. Pat. No. 4,478,381 to Pittion et al., U.S. Pat. No. 5,201,100 to Cardinale, U.S. Pat. No. 5,413,228 to Le Clerc, U.S. Pat. No. 6,101,684 to Ginocchio, U.S. Pat. No. 6,948,878 to Smith, Jr. et al., U.S. Pat. No. 8,079,610 to Winefordner et al., U.S. Patent Application Publication No. 2010/021144 to Radle et al., U.S. Design Pat. No. D521,366 to Polak et al., U.S. Design Pat. No. D580,748 to Polak et al.

Some of the features shown in one attachment device may be integrated with other attachment devices. For example, the minimal padding (FIG. 13) and/or significant padding (FIG. 14) could be incorporated on other attachment devices (e.g. those shown in FIGS. 10-14).

Frame Subsystem

As set forth above, for purposes of explaining the rack and frame system, it should be understood that there are two functions that the system accomplishes simultaneously. In this section, the frame function will be discussed.

The frame subsystem is designed to display photographs by mounting a frame to each respective base mount. The frame subsystem preferably includes a two-part base/frame connector: a base mount 130 (which may have one or more base associated connection aids) and a frame 160, 164 (which may have one or more frame associated connection aids). As will be discussed, all or part of the base mount 130 (which may have one or more base associated connection aids) may function as the base sub-connector. As will also be discussed, all or part of the frame 160, 164 (which may have one or more frame associated connection aids) may function as the frame sub-connector. The base sub-connector and the frame sub-connector function together as a two-part base/frame connector.

Figure 16:
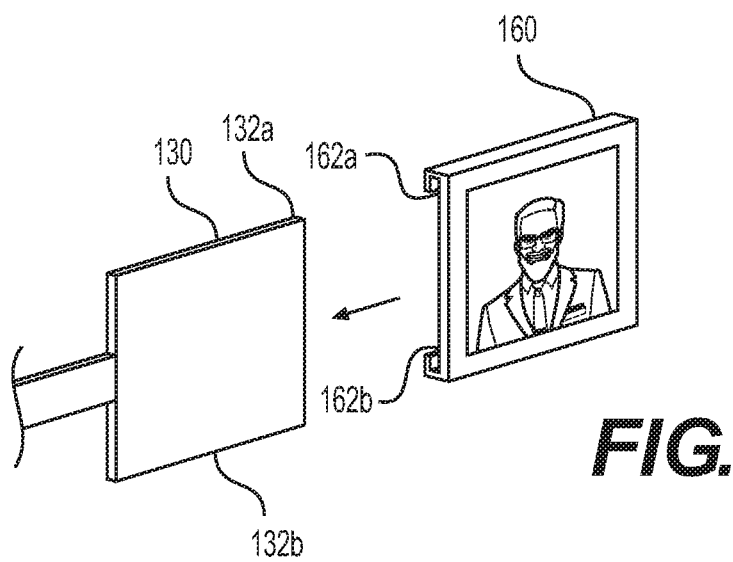
FIG. 16 is a perspective view of a base rib with a first exemplary base mount and a frame, all or part of the first exemplary base mount (shown without base associated connection aids) and all or part of the frame (shown without frame associated connection aids) forming a two-part base/frame connector.

FIG. 16 is a general depiction of direct attachment between a base mount 130 and a frame 160. FIG. 16 shows a base rib 120 with a first exemplary base mount 130 and a frame 160. All or part of the first exemplary base mount 130 (shown without base associated connection aids) and all or part of the frame 160 (shown without frame associated connection aids) form a two-part base/frame connector. In this shown version, the upper and lower edges 132a, 132b of the base mount 130 and the upper and lower edges 162a, 162b of the frame 160 form a two-part base/frame connector. As shown, the frame's upper and lower edges 162a, 162b have associated channels. The "upper edge channel" is shown as the frame's upper edge 162a being bent downward. The "lower edge channel" is shown as the frame's lower edge 162b being bent upward. As shown, the base mount's upper edge 132a slides into the channel at the frame's upper edge 162a, and the base mount's lower edge 132b slides into the channel at the frame's lower edge 162b. An alternative version could have channels associated with the upper and lower edges of the base mount. The upper and lower edges of the frame (now, unbent) would than mate with the respective channeled upper and lower edges ("upper edge channel" and lower "edge channel") of the base mount to form a two-part base/frame connector. In such an alternative version, the photograph could function as its own frame with its upper and lower edges being and be slid directly into the respective channeled upper and lower edges of the base mount. This type of mounting allows for easy removal and replacement of frames 130.

Figure 17:
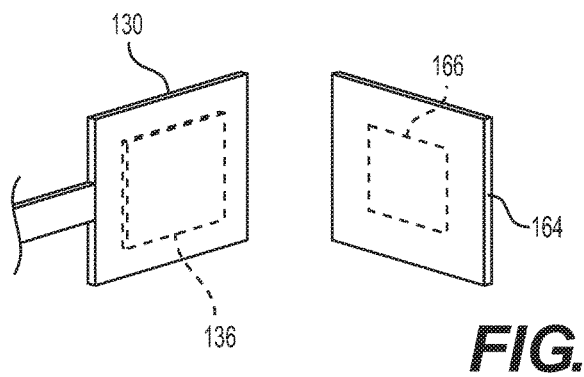
FIG. 17 is a perspective view of a base rib with a second exemplary base mount and a frame, all or part of the second exemplary base mount (shown with an optional base associated connection aid) and all or part of the frame (shown with an optional frame associated connection aid) forming a two-part base/frame connector.

FIG. 17 is a general depiction of indirect attachment between a base mount 130 and a frame 164. FIG. 17 shows a base rib 120 with a second exemplary base mount 130 and a frame 164 (which is shown as being substantially planar or flat). All or part of the second exemplary base mount 130 (shown with an optional base associated connection aid 136) and all or part of the frame 164 (shown with an optional frame associated connection aid 166) forming a two-part base/frame connector. It should be noted that the shown first exemplary base mount 130 and second exemplary base mount 130 are shown as being identical, but are used with different frames 160, 164. As discussed with the respective versions, alternative versions of both the first and second exemplary base mounts, may, however, be different. The base associated connection aid 136, the frame associated connection aid 166, or both the base associated connection aid 136 and the frame associated connection aid 166 are used to connect the base mount 130 to the frame 164. Exemplary connection aids include, but are not limited to, magnets, hook and loop material, mechanical connectors (e.g. clips, hooks, buttons), adhesives (particularly semi-permanent adhesives, although permanent adhesives could work in certain circumstances), custom connectors (e.g. two press-fit connectors designed specifically to work in conjunction with each other), and other connection aids known or yet to be discovered.

Figure 18:
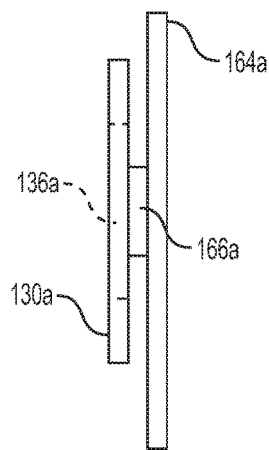
FIG. 18 is a side view of a base mount and a frame with an associated connection aid therebetween.

FIG. 18 is an example of indirect attachment between a base mount 130 and a frame 164a using a single associated connection aid. FIG. 18 is an example of FIG. 17 that shows a base mount 130a and a frame 164a with an associated connection aid therebetween. As shown, the base mount 130a may be made from magnetic material 136a and the associated connection aid is a magnet 166a associated (permanently or temporarily) with the frame 164a. An alternative configuration would be a frame made from magnetic material and the associated connection aid being a magnet associated with the base mount. Yet another alternative configuration is both the base mount and a frame being made from magnetic material and the associated connection aid being a magnet associated with both the base mount and the frame.

Figure 19:
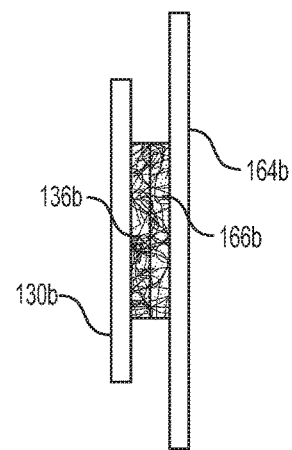
FIG. 19 is a side view of a base mount with a first part of a hook/loop base associated connection aid and a frame with a second part of a hook/loop frame associated connection aid.

FIG. 19 is an example of indirect attachment between a base mount 130 and a frame 164b using multiple associated connection aids. FIG. 19 is an example of FIG. 17 that shows a base mount 130b with a first part of a hook/loop base associated connection aid 136b and a frame 164b with a second part of a hook/loop frame associated connection aid 166b. The first part of a hook/loop base associated connection aid would be hook fabric if the second part of a hook/loop frame associated connection aid is loop fabric. On the other hand, the first part of a hook/loop base associated connection aid would be loop fabric if the second part of a hook/loop frame associated connection aid is hook fabric. Although this figure describes the associated connection aids as the two parts of hook and loop fabric, other two-part associated connection aids could be used with a first part associated with the base mount and the second part being associated with the frame.

As noted above, the photographs are shown in frames 160, 164, but the photographs themselves and/or the photographs' edges could function as their own frames. For example, the second part of a hook/loop frame associated connection aid could be associated with the back of a photograph.

Figure 20:
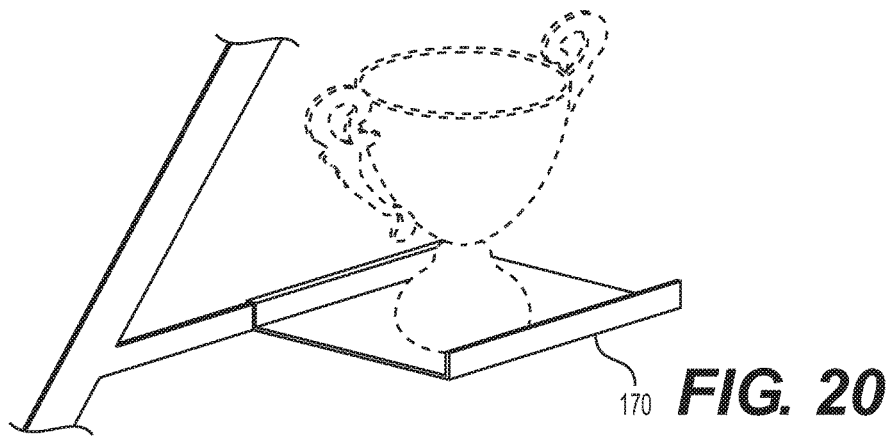
FIG. 20 is a perspective view of a base rib with an exemplary display shelf.

FIG. 20 shows a base rib 120 with an exemplary display shelf 170. As shown, the shelf 170 is connected to a base rib 120 directly. Alternatively, the shelf 170 is connected to a base rib 120 indirectly. The shelf 170 (with or without an associated rib) may be integral with the base rib 120, or it may be modular in that it could be removable and replaceable. The shelf 170 could be connected (directly or indirectly) to a base mount 130 using, for example, magnets, mechanical connectors (e.g. hooks), or other connectors that are suitable for connecting a shelf to a base rib and/or base mount.

Examples

Figure 21:
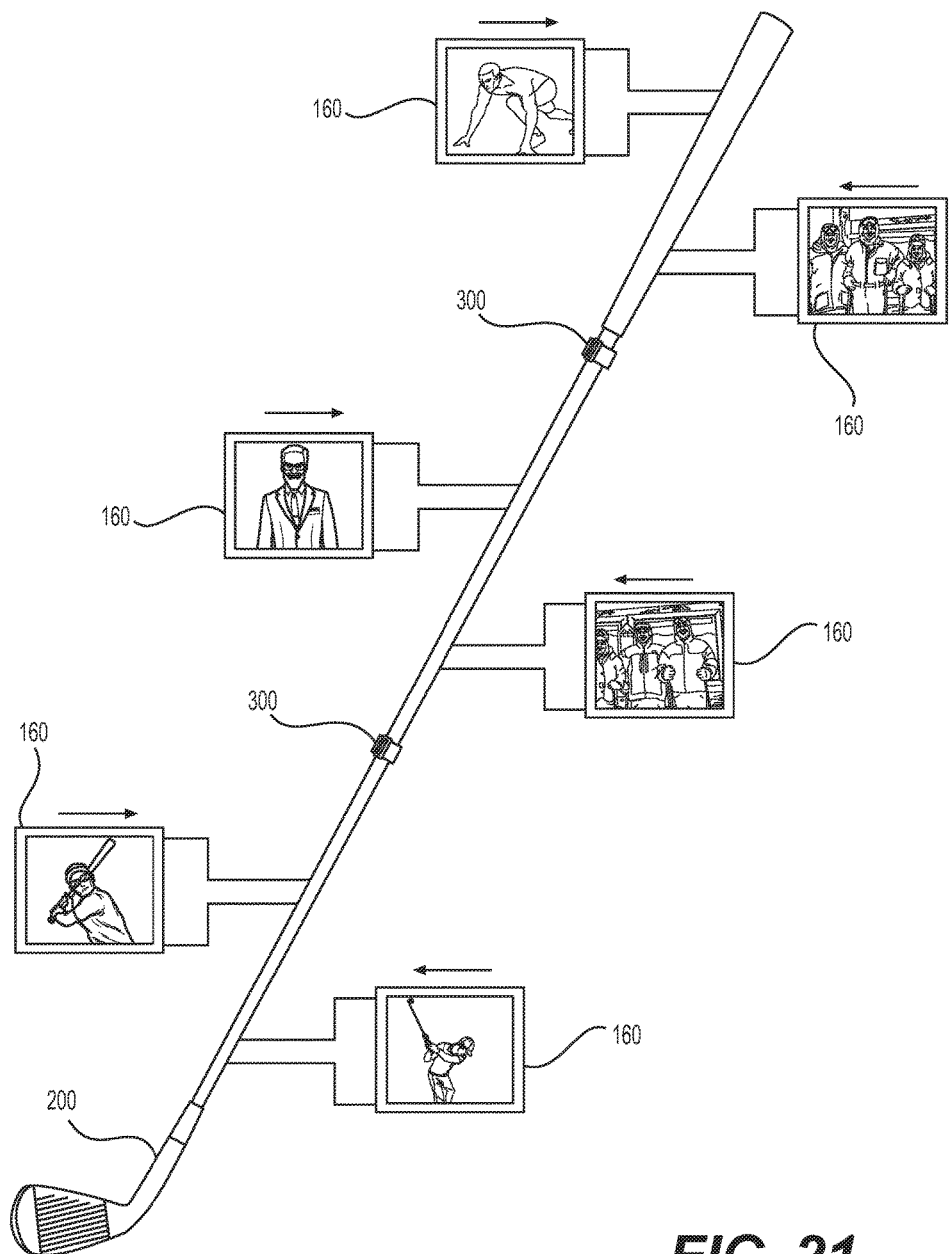
FIG. 21 is a front view of a golf club attached to a base spine and photographs displayed in a frame on an exemplary rack and frame system, the golf club shown as being secured to the base using first exemplary attachment devices (such as those shown in FIG. 9).

FIG. 21 shows a golf club 200 attached to a base spine and photographs displayed in a frame 160 on an exemplary rack and frame system, the golf club 200 shown as being secured to the base using first exemplary attachment devices 300 (such as those shown in FIG. 9). Although the base in this example cannot be seen, any of the bases 100a-100f could be used. Although the first exemplary attachment devices 300 are used in this example, alternative attachment devices (e.g. attachment devices 300, 310, 320, 330, 340, 350, 360) could be used. The frames 160 in this example are shown as being connected to the base mount 130 in the same manner as is shown in FIG. 16, but the alternative connection systems disclosed herein (e.g. those discussed in relation to FIGS. 17-19) are possible.

Figure 22:
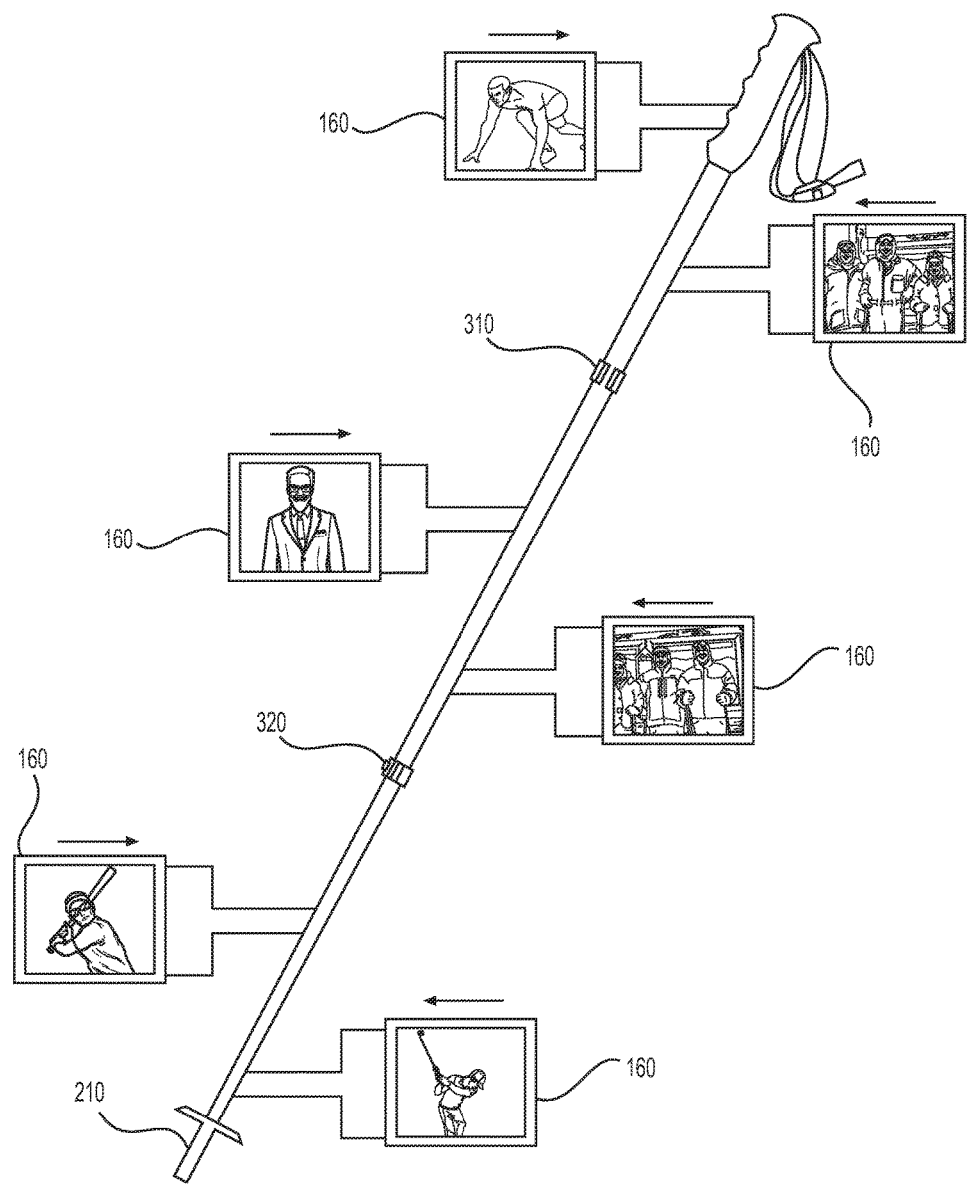
FIG. 22 is a front view of a ski pole attached to a base spine and photographs displayed in a frame on an exemplary rack and frame system, the ski pole shown as being secured to the base using a second exemplary attachment device (such as the one shown in FIG. 10) and a third exemplary attachment device (such as the one shown in FIG. 11).

FIG. 22 shows a ski pole 210 attached to a base spine and photographs displayed in a frame 160 on an exemplary rack and frame system, the ski pole 210 shown as being secured to the base using a second exemplary attachment device 310 (such as the one shown in FIG. 10) and a third exemplary attachment device 320 (such as the one shown in FIG. 11). Although the base in this example cannot be seen, any of the bases 100a-100f could be used. Although the second exemplary attachment device 310 and third exemplary attachment device 320 are used in this example, alternative attachment devices (e.g. attachment devices 300, 310, 320, 330, 340, 350, 360) could be used. This example is also designed to show that multiple types of attachment devices can be used. The frames 160 in this example are shown as being connected to the base mount 130 in the same manner as is shown in FIG. 16, but the alternative connection systems disclosed herein (e.g. those discussed in relation to FIGS. 17-19) are possible.

Figure 23:
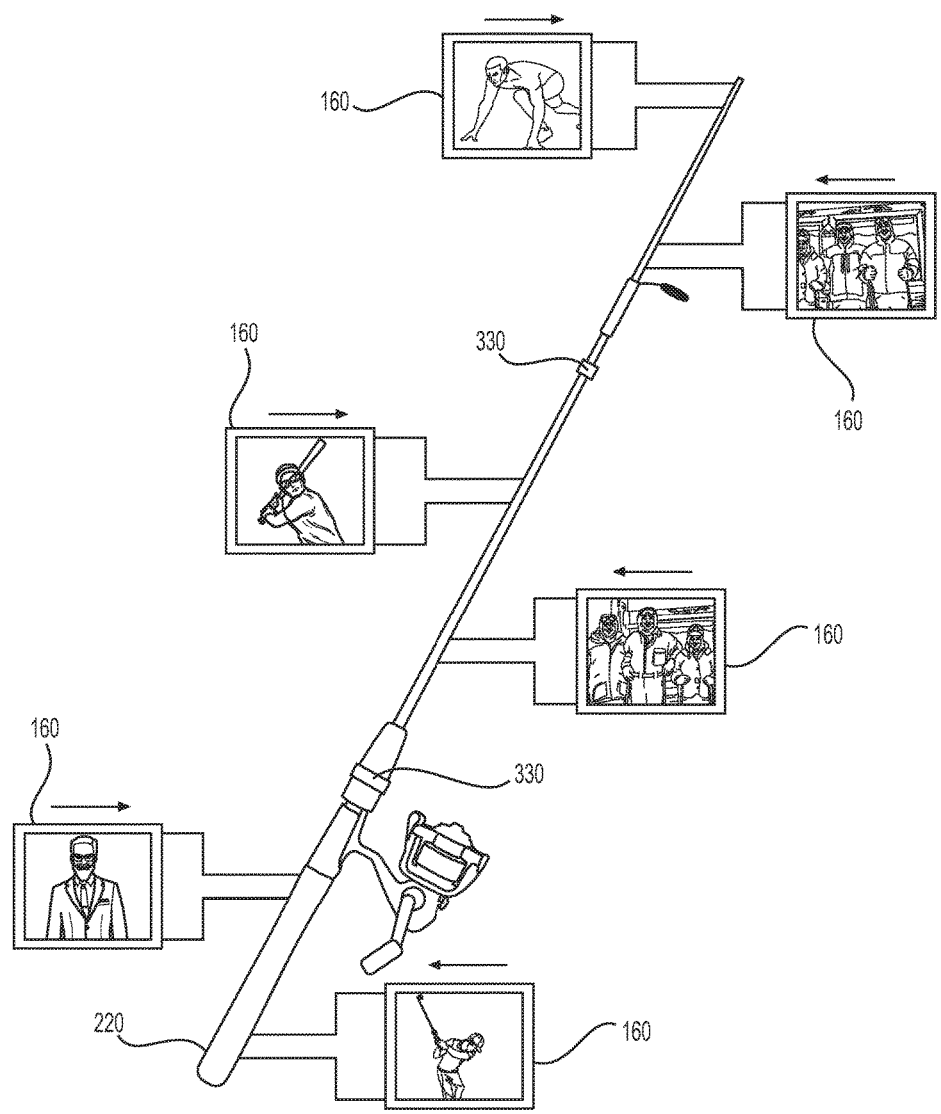
FIG. 23 is a front view of a fishing pole attached to a base spine and photographs displayed in a frame on an exemplary rack and frame system, the fishing pole shown as being secured to the base using fourth exemplary attachment devices (such as those shown in FIG. 12).

FIG. 23 shows a fishing pole 220 attached to a base spine and photographs displayed in a frame 160 on an exemplary rack and frame system, the fishing pole 220 shown as being secured to the base using fourth exemplary attachment devices 330 (such as those shown in FIG. 12). Although the base in this example cannot be seen, any of the bases 100a-100f could be used. Although the fourth exemplary attachment devices 330 are used in this example, alternative attachment devices (e.g. attachment devices 300, 310, 320, 330, 340, 350, 360) could be used. The frames 160 in this example are shown as being connected to the base mount 130 in the same manner as is shown in FIG. 16, but the alternative connection systems disclosed herein (e.g. those discussed in relation to FIGS. 17-19) are possible.

Figure 24:
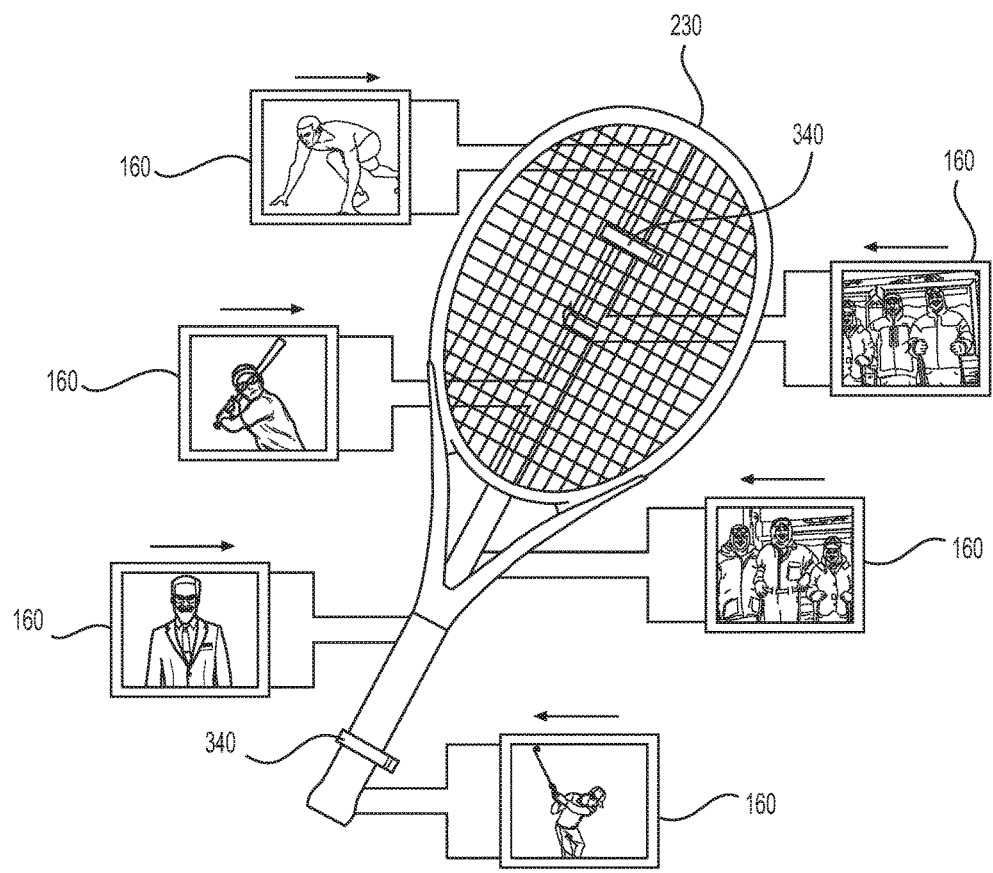
FIG. 24 is a front view of a tennis racket attached to a base spine and photographs displayed in a frame on an exemplary rack and frame system, the tennis racket shown as being secured to the base using fifth exemplary attachment devices (such as those shown in FIG. 13).

FIG. 24 shows a tennis racket 230 attached to a base spine and photographs displayed in a frame 160 on an exemplary rack and frame system, the tennis racket 230 shown as being secured to the base using fifth exemplary attachment devices 240 (such as those shown in FIG. 13). The exemplary bases 100a-100f could be modified and used in this example. For example, the base spine in this example is shorter to accommodate the tennis racket 230. Also, the base ribs are shown as being longer to accommodate the width of the tennis racket 230. Although the fifth exemplary attachment devices 240 are used in this example, alternative attachment devices (e.g. attachment devices 300, 310, 320, 330, 340, 350, 360) could be used. The frames 160 in this example are shown as being connected to the base mount 130 in the same manner as is shown in FIG. 16, but the alternative connection systems disclosed herein (e.g. those discussed in relation to FIGS. 17-19) are possible.

FIG. 25 shows a ski 240 attached to a base spine and photographs displayed in a frame 160, 162 on an exemplary rack and frame system, the ski 240 shown as being secured to the base using sixth exemplary attachment devices 250 (such as those shown in FIG. 14). Although the base in this example cannot be seen, any of the bases 100a-100f could be used. Although the sixth exemplary attachment devices 250 are used in this example, alternative attachment devices (e.g. attachment devices 300, 310, 320, 330, 340, 350, 360) could be used. The frames 160 in this example are shown as being connected to the base mount 130 in the same manner either using the system shown in FIG. 16 or the alternative connection systems disclosed herein (e.g. those discussed in relation to FIGS. 17-19).

Ornamental Aspects

FIGS. 26-31 show the ornamental aspects of the base of an exemplary rack and frame system. The broken lines and/or omitted portions of the base are for the purpose of illustrating portions of the base and form no part of the claimed design. The spine and ribs of the base are shown with symbolic breaks in their length. The appearance of any portion of the spine or rib between the break lines forms no part of the claimed design. Views of the base that are not shown in these figures (e.g. the back side) form no part of the ornamental design.

Miscellaneous

The shown rack and frame system may be modular as discussed above. The rack and frame system may also be displayed with other rack and frame systems. For example, two rack and frame systems may be hung crossed. Alternatively, the rack and frame system may be hung in a line to make a double (or triple) length rack and frame system.

It is to be understood that the inventions, examples, versions, and embodiments described herein are not limited to particularly exemplified materials, methods, and/or structures. It is to be understood that the inventions, examples, versions, and embodiments described herein are to be considered preferred inventions, examples, versions, and embodiments whether specifically identified as such or not. The shown inventions, examples, versions, and embodiments are preferred, but are not meant to be limiting unless specifically claimed, in which case they may limit the scope of that particular claim.

All references (including, but not limited to, foreign and/or domestic publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A rack and frame system for displaying equipment/memorabilia and photographs, said system comprising:
   (a) a base, said base comprising;
      (i) a base spine;
      (ii) a plurality of base ribs extending from said base spine, each base rib having a first rib end and a second rib end, said first rib end remote from said second rib end;
      (iii) a plurality of base mounts; and
      (iv) for each base rib of said plurality of base ribs, said first rib end associated with said base spine and said second rib end associated with one of said plurality of base mounts;
   (b) a rack subsystem comprising at least one attachment device and said base spine, said at least one attachment device for removably securing said equipment/memorabilia to said base spine; and
   (c) a frame subsystem comprising a plurality of frames and said plurality of base mounts, each of said plurality of frames connectable to a respective base mount.

2. The system of claim 1, rack subsystem designed to display said equipment/memorabilia at a hanging angle of between 30 degrees and 70 degrees.

3. The system of claim 1, said base spine being designed to be hung at a hanging angle, each base rib of said plurality of base ribs associated with said base spine at a rib angle, said hanging angle equal to said rib angle such that said base ribs are parallel to each other.

4. The system of claim 1, said base spine being a telescoping base spine.

5. The system of claim 1, said base ribs being adjustable base ribs.

6. The system of claim 1, each attachment device being a secure attachment device.

7. The system of claim 1, each attachment device being of a type selected from the group consisting of:
   (a) a fabric attachment device;
   (b) a claw attachment device;
   (c) an adjustable attachment device;
   (d) a hidden attachment device;
   (e) a pinch attachment device;
   (f) a padded attachment device; and
   (g) a magnet attachment device.

8. The system of claim 1, each of said plurality of frames being directly connectable to a respective base mount.

9. The system of claim 1, each of said plurality of frames having an upper edge with an associated channel and a lower edge with an associated channel, each base mount having an upper edge and a lower edge, said upper edge of one of said base mounts slideable into to a respective upper edge channel of said frame, said lower edge of one of said base mounts slideable into to a respective lower edge channel of said frame.

10. The system of claim 1, each of said plurality of frames being indirectly connectable to a respective base mount.

11. The system of claim 1, each of said plurality of frames being indirectly connectable to a respective base mount using at least one associated connection aid.

12. A rack and frame system for displaying equipment/memorabilia and photographs, said system comprising:
   (a) a base, said base comprising;
      (i) a base spine designed to be hung at a hanging angle of between 30 degrees and 70 degrees;
      (ii) a plurality of base ribs extending from said base spine, each base rib having a first rib end and a second rib end, said first rib end remote from said second rib end;
      (iii) a plurality of base mounts; and
      (iv) for each base rib of said plurality of base ribs, said first rib end associated with said base spine and said second rib end associated with one of said plurality of base mounts, each base rib of said plurality of base ribs associated with said base spine at a rib angle, said hanging angle equal to said rib angle such that said base ribs are parallel to each other;
   (b) a rack subsystem comprising at least one attachment device and said base spine, said at least one attachment device for removably securing said equipment/memorabilia to said base spine; and
   (c) a frame subsystem comprising a plurality of frames and said plurality of base mounts, each of said plurality of frames connectable to a respective base mount.

13. The system of claim 12, said base spine being a telescoping base spine.

14. The system of claim 12, said base ribs being adjustable base ribs.

15. The system of claim 12, each attachment device being a secure attachment device.

16. The system of claim 12, each of said plurality of frames being directly or indirectly connectable to a respective base mount.

17. The system of claim 12, each of said plurality of frames having an upper edge with an associated channel and a lower edge with an associated channel, each base mount having an upper edge and a lower edge, said upper edge of one of said base mounts slideable into to a respective upper edge channel of said frame, said lower edge of one of said base mounts slideable into to a respective lower edge channel of said frame.

18. The system of claim 12, each of said plurality of frames being indirectly connectable to a respective base mount using at least one associated connection aid.

19. A rack and frame system for displaying equipment/memorabilia and photographs, said system comprising:
   (a) a base, said base comprising;
      (i) a base spine designed to be hung at a hanging angle of between 30 degrees and 70 degrees;
      (ii) a plurality of base ribs extending from said base spine, each base rib having a first rib end and a second rib end, said first rib end remote from said second rib end;
      (iii) a plurality of base mounts; and
      (iv) for each base rib of said plurality of base ribs, said first rib end associated with said base spine and said second rib end associated with one of said plurality of base mounts, each base rib of said plurality of base ribs associated with said base spine at a rib angle, said hanging angle equal to said rib angle such that said base ribs are parallel to each other;
   (b) a rack subsystem comprising at least one attachment device and said base spine, said at least one secure attachment device for removably securing said equipment/memorabilia to said base spine; and
   (c) a frame subsystem comprising a plurality of frames and said plurality of base mounts, each of said plurality of frames being directly or indirectly connectable to a respective base mount.

* * * * *